United States Patent
Yaffe

(10) Patent No.: US 9,561,831 B2
(45) Date of Patent: Feb. 7, 2017

(54) MOTORCYCLE FAIRING SUPPORT MEMBER AND ASSEMBLY AND METHOD OF SUPPORTING A MOTORCYCLE FAIRING

(71) Applicant: Paul Yaffe, Phoenix, AZ (US)

(72) Inventor: Paul Yaffe, Phoenix, AZ (US)

( * ) Notice: Subject to any disclaimer, the term of this patent is extended or adjusted under 35 U.S.C. 154(b) by 13 days.

(21) Appl. No.: 14/796,314

(22) Filed: Jul. 10, 2015

(65) Prior Publication Data

US 2017/0008587 A1    Jan. 12, 2017

(51) Int. Cl.
    *B62J 99/00*  (2009.01)
    *B62J 17/04*  (2006.01)

(52) U.S. Cl.
    CPC ..................... *B62J 17/04* (2013.01)

(58) Field of Classification Search
    CPC ...................................... B62J 17/04
    See application file for complete search history.

(56) References Cited

U.S. PATENT DOCUMENTS

| | | | |
|---|---|---|---|
| 4,135,758 A * | 1/1979 | Clements ................ | B62J 17/02 296/78.1 |
| 4,331,344 A * | 5/1982 | Vetter .................... | B62J 17/02 280/270 |
| 6,155,369 A * | 12/2000 | Whittaker ............... | B62M 6/90 180/206.5 |
| 6,293,606 B1 * | 9/2001 | Jarosz ..................... | B62J 17/04 296/78.1 |
| 2009/0241891 A1 * | 10/2009 | Tsubakino ............. | F01L 1/022 123/193.5 |
| 2011/0155083 A1 * | 6/2011 | Sato ..................... | F01L 13/0021 123/54.4 |
| 2011/0186370 A1 * | 8/2011 | Ishii ....................... | B62J 37/00 180/69.4 |

* cited by examiner

*Primary Examiner* — Lori L Lyjak
(74) *Attorney, Agent, or Firm* — Ice Miller LLP

(57) ABSTRACT

A motorcycle fairing support member and assembly and method of supporting a motorcycle fairing are disclosed. The fairing support member includes a central portion extending laterally when mounted on a motorcycle and having a first end, a second end, and a central coupling portion configured to couple the fairing support member to a fairing bracket of the motorcycle. A first support portion is disposed at the first end of the central portion and extends to support a motorcycle fairing. A second support portion is disposed at the second end of the central portion and extends to support the motorcycle fairing. The central portion, first support portion, and second support portion are configured to be concealed by the motorcycle fairing when the motorcycle fairing support member is mounted on the motorcycle.

25 Claims, 7 Drawing Sheets

MOTORCYCLE FAIRING SUPPORT MEMBER AND ASSEMBLY AND METHOD OF SUPPORTING A MOTORCYCLE FAIRING

BACKGROUND

Some motorcycles include a front fairing assembly located near a top portion of the fork assembly. When rigidly coupled to the motorcycle frame, the front fairing assembly may also have support on left and right side portions of the front fairing assembly. The left and right side portions of the front fairing assembly are conventionally supported by individual mounting brackets extending upward to the front fairing assembly from a lower frame portion or an engine guard. Such mounting brackets may add weight to the motorcycle, increase aerodynamic drag of the motorcycle, and adversely affect the aesthetic appearance of the motorcycle.

Therefore, there exists a need for a motorcycle fairing support member, a motorcycle fairing support assembly, and a method of supporting a motorcycle fairing that reduces the weight of the motorcycle, reduces aerodynamic drag, and improves the aesthetic appearance of the motorcycle.

SUMMARY

In accordance with an embodiment of the present disclosure, a motorcycle fairing support assembly is provided. The motorcycle fairing support includes a fairing bracket extending longitudinally forward from a neck portion of a motorcycle frame, an inner fairing member coupled to the fairing bracket, a fairing support member adjacent to an inner fairing member outer surface and having a central portion coupled to the fairing bracket, and an outer fairing member coupled to the inner fairing member and concealing the fairing support member.

In accordance with an additional embodiment of the present disclosure, a motorcycle fairing support member is provided. The motorcycle fairing support member includes a central portion extending laterally when mounted on a motorcycle and having a first end, a second end, and a central coupling portion configured to couple the fairing support member to a fairing bracket of the motorcycle, a first support portion disposed at the first end of the central portion and extending to support a motorcycle fairing, and a second support portion disposed at the second end of the central portion and extending to support the lower portion of the motorcycle fairing, wherein the central portion, first support portion, and second support portion are configured to be concealed by the motorcycle fairing when the motorcycle fairing support member is mounted on the motorcycle.

In accordance with an additional embodiment of the present disclosure, a method of supporting a motorcycle fairing is provided. The method includes providing a fairing support member having a central portion with a central coupling portion for coupling to a fairing bracket of a motorcycle, a first support portion for coupling to a lower portion of an inner fairing member, and a second support portion for coupling to the lower portion of the inner fairing member, coupling the fairing support member to the fairing bracket at the central coupling portion, and supporting the inner fairing member at the lower portion of the inner fairing member with the first support portion and the second support portion of the fairing support member.

BRIEF DESCRIPTION OF THE FIGURES

The embodiments described herein and other features, advantages, and disclosures contained herein, and the manner of attaining them, will be better understood from the following description in conjunction with the accompanying drawing figures, in which like reference numerals identify like elements, and wherein.

DETAILED DESCRIPTION

In the following detailed description of embodiments of the present disclosure, reference is made to the accompanying drawings that form a part hereof, and in which is shown by way of illustration, and not by way of limitation, such specific embodiments. It is to be understood that other embodiments may be utilized and that changes may be made without departing from the spirit and scope of the present disclosure.

Figure 1:
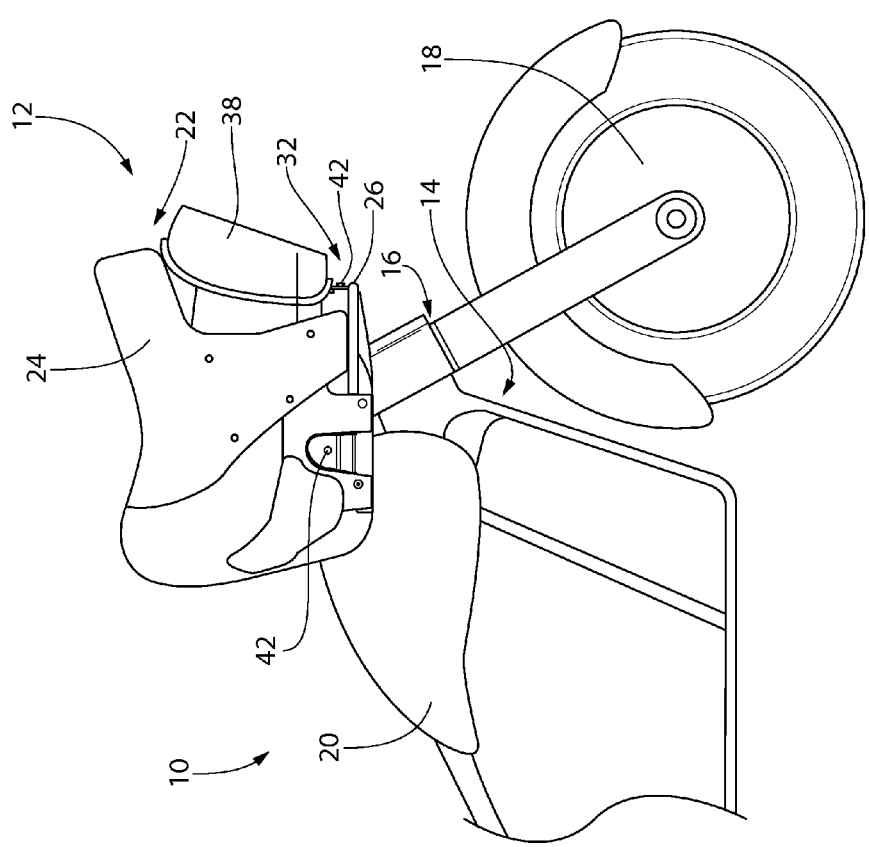
FIG. 1 is a side elevation view of a front portion of a motorcycle having a fairing support assembly in accordance with aspects of the present disclosure.
Figure 2:
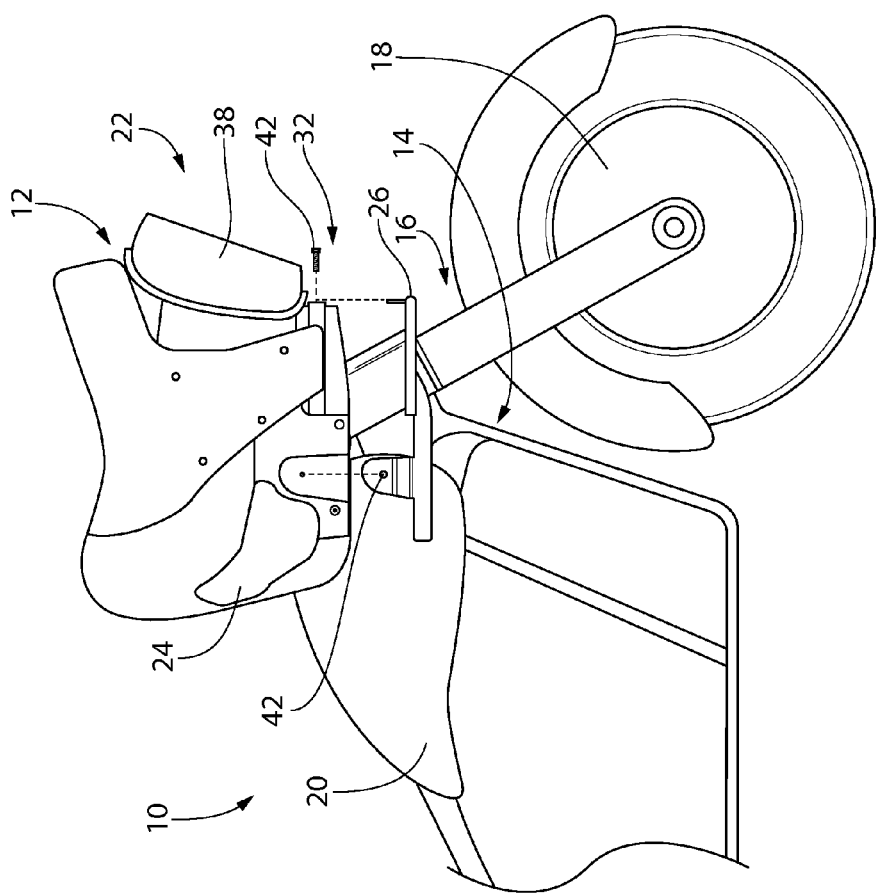
FIG. 2 is a partially exploded side elevation view of a motorcycle having a fairing support assembly in accordance with aspects of the present disclosure.
Figure 3:
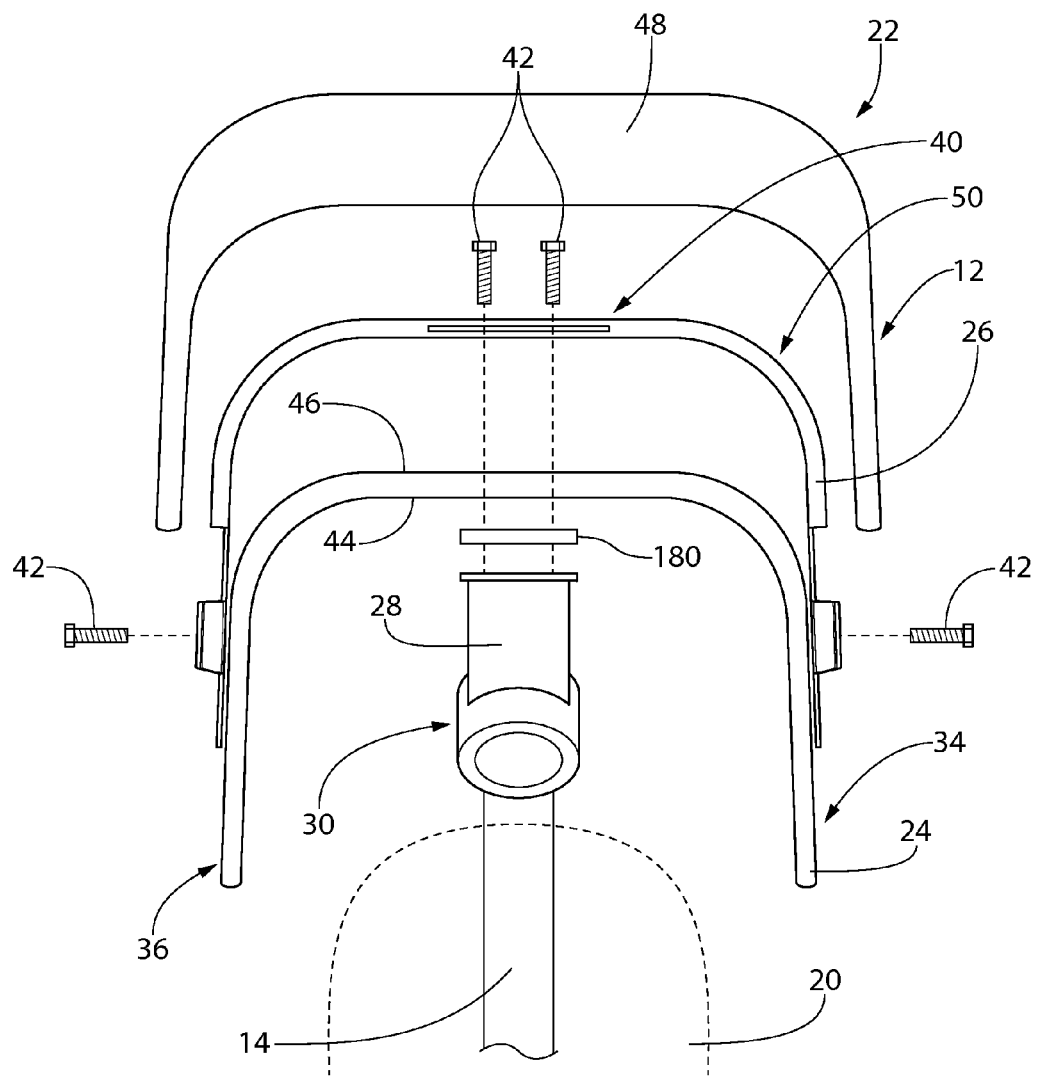
FIG. 3 is a top partially exploded view of a motorcycle having a fairing support assembly in accordance with aspects of the present disclosure.

Referring to FIGS. 1-3, a motorcycle fairing support assembly 12 is shown. The front portion of a motorcycle 10 includes a frame 14, a fork assembly 16, a front wheel 18, a fuel tank 20, and a motorcycle fairing 22. The motorcycle fairing 22 includes an inner fairing member 24 and a fairing support member 26 coupled to a fairing bracket 28 at a neck portion 30 of the frame 14, as best shown in FIG. 3. The fairing support member 26 is coupled to the inner fairing member 24 at a lower portion 32 of the inner fairing member 24 The fairing support member 26 is coupled to the lower portion 32 at a right side 34 and a left side 36 of the inner fairing member 24. The fairing support assembly 12 of an embodiment includes a headlamp 38 disposed at least partially at a higher location than the fairing support member 26 when the fairing support assembly 12 is mounted on the motorcycle 10, as illustrated in FIG. 1. The embodiment of FIGS. 1-3 illustrates the fairing bracket 28 being coupled to a forward end of the neck portion 30. In one or more embodiments, the fairing bracket 28 is integrally formed with the neck portion 30. In additional embodiments, the fairing bracket 28 is defined by any structure allowing coupling or attachment of the inner fairing member 24 to the neck portion 30.

Referring specifically to FIGS. 2 and 3, the fairing support member 26 is coupled to the fairing bracket 28 at a central portion 40 of the fairing support member 26 with one or more fasteners 42. In one or more embodiments, the fairing support member 26 is coupled to the fairing bracket 28 using other coupling means such as integral formation, welding, adhesives, or interference fitting. Additionally, the fairing support member 26 is coupled to the lower portion 32 of the inner fairing member 24 at the right side 34 and the left side 36 of the inner fairing member 24 using one or more fasteners 42. In one or more embodiments, the fairing support member 26 is coupled to the inner fairing member 24 using other coupling means such as integral formation, welding, adhesives, or interference fitting. One of ordinary skill will recognize various coupling and fastening means, and such methods and structures are included in the present disclosure with regard to any coupling operations or structures.

A top partially exploded view of an embodiment of the fairing support assembly 12 is shown in the embodiment of FIG. 3. The fairing bracket 28 of FIG. 3 extends longitudinally forward from the neck portion 30 of the frame 14. The inner fairing member 24 is coupled to the fairing bracket 28 at rear wall 44 of the inner fairing member 24. In an embodiment, the inner fairing member 24 extends longitudinally rearward, thereby wrapping around the fairing bracket 28 and neck portion 30 of the frame 14. In another embodiment, the inner fairing member 24 extends longitudinally rearward to partially enclose and/or partially obscure the fairing bracket 28 and/or the neck portion 30 of the frame 14. In another embodiment, the inner fairing 24 is disposed adjacent to the fairing bracket 28 and/or the neck portion 30. The fairing support member 26 is adjacent to an outer surface 46 of inner fairing member 24, as illustrated in FIG. 3. The central portion 40 of the fairing support member 26 is coupled to the fairing bracket 28. In an embodiment, the central portion 40 is coupled directly to the fairing bracket 28 with the inner fairing member 24 disposed generally adjacent to the central portion 40. In an embodiment, an outer fairing member 48 is coupled to the inner fairing member 24. When the outer fairing member 48 is coupled to the inner fairing member 24, the outer fairing member 48 conceals or hides the fairing support member 26. Concealment in an embodiment includes being hidden from view from the perspective of a person operating the motorcycle 10 illustrated in the present disclosure. Concealment in an embodiment includes being hidden from view from the perspective of a person standing within ten feet of the motorcycle 10. Concealment in another embodiment includes being hidden from view from the perspective of a person located on another motorcycle or in a vehicle located within ten feet of the motorcycle 10. Concealment, according to a further embodiment, includes being only partially concealed from view from any perspective. The fairing support member 26 of an embodiment includes a contour 50. The contour 50 of one or more embodiments includes the contour of an inner surface of the fairing support member 26, an outer surface of the fairing support member 26, and/or one or more structural aspects of the fairing support member 26. The contour 50 of an embodiment substantially corresponds with a contour of the outer surface 46 of the inner fairing member 24, as shown in FIG. 3. Although the present disclosure describes an inner fairing member 24 and an outer fairing member 48, the existence of an inner fairing member does not require the existence of an outer fairing member and the existence of an outer fairing member does not require the existence of an inner fairing member.

Referring again to FIG. 3, an embodiment of the present disclosure includes a fairing adjustment member 180 positioned between the fairing bracket 28 and the inner fairing member 24 and/or the fairing support member 26, as described in the patent application filed on the same date as the present application and entitled "Motorcycle Fairing Adjustment Member and Assembly and Method of Adjusting a Motorcycle Fairing" by inventor Paul Yaffe, which is hereby incorporated by reference in its entirety. The fairing adjustment member 80 of an embodiment forms part of a fairing assembly illustrated in FIG. 3 and is configured to have a forward surface and a rearward surface angled from each other to provide an adjustment of the motorcycle fairing 22. In particular non-limiting embodiments, the fairing adjustment member 80 is generally wedge-shaped with an angle of 7 degrees or 9 degrees.

Figure 4:
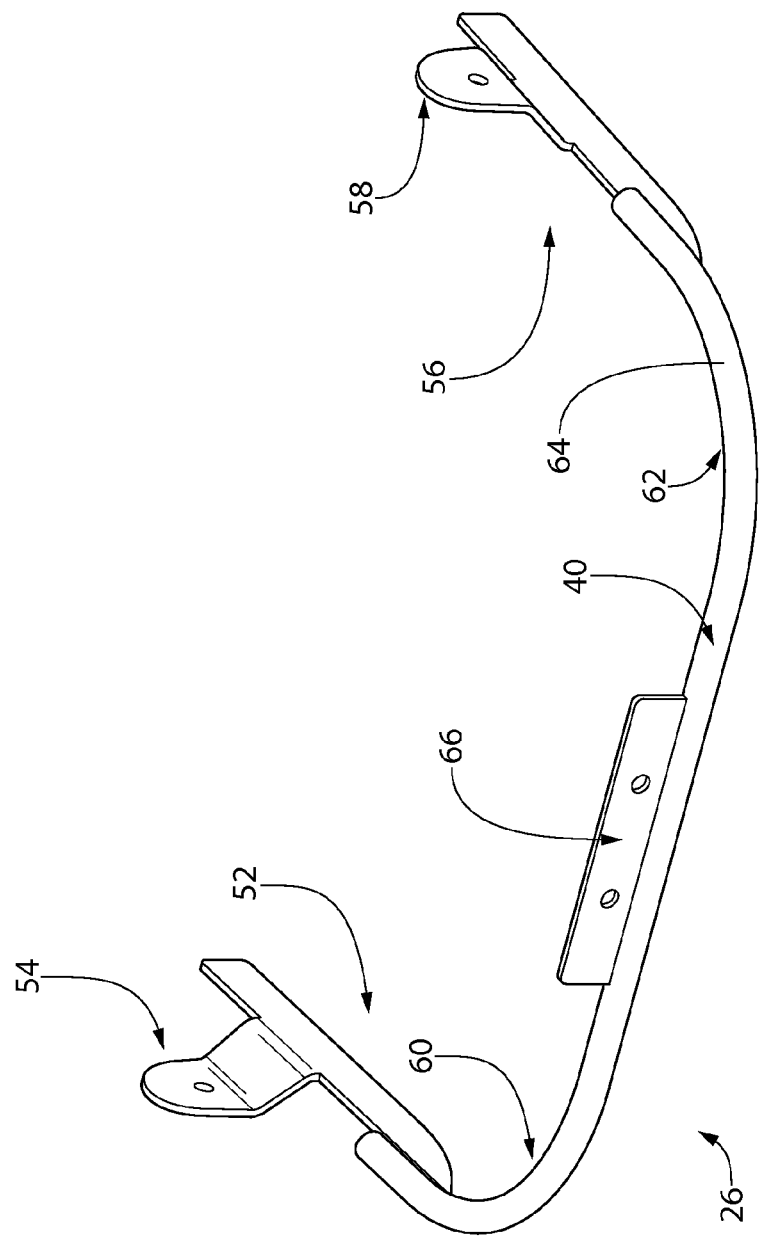
FIG. 4 is a perspective view of a fairing support member in accordance with aspects of the present disclosure.

Referring now to FIG. 4, the fairing support member 26 includes a first support portion 52 having a first coupling portion 54 coupling the fairing support member 26 to the inner fairing member 24 shown in FIGS. 1-3. The fairing support member 26 further includes a second support portion 56 having a second coupling portion 58 coupling the fairing support member 26 to the inner fairing member 24 shown in FIGS. 1-3. The fairing support member 26 of an embodiment includes the first support portion 52 at a first end 60 of the central portion 40, the second support portion 56 at a second end 62 of the central portion 40, and a bar 64 extending continuously from the first support portion 52 to the second support portion 56. In one embodiment, the bar 64 is a solid round bar. In other embodiments, the bar 64 is square or rectangular and/or solid or hollow.

Figure 5:
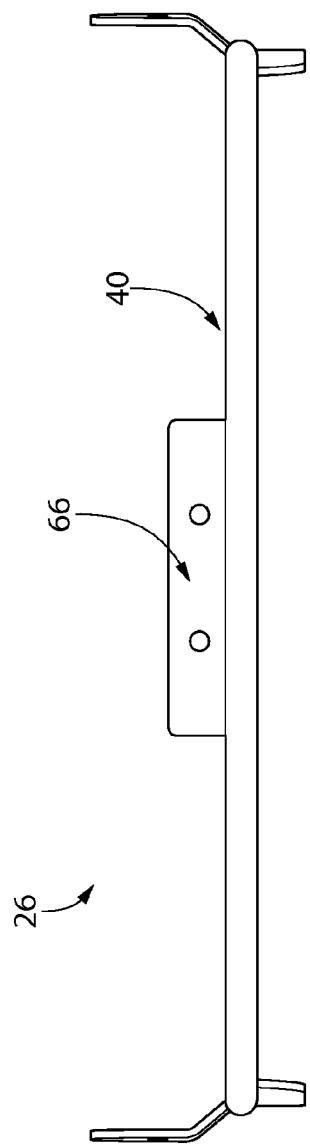
FIG. 5 is a front elevation view of a fairing support member in accordance with aspects of the present disclosure.

Referring now to FIG. 5 with continuing reference to FIGS. 1-3, the central portion 40 extends laterally when mounted on the motorcycle 10. The central portion 40 of an embodiment has the central coupling portion 66 that is configured to couple the fairing support member 26 to the fairing bracket 28 of the motorcycle 10, as illustrated in FIGS. 1-3. The central coupling portion 66 in an embodiment couples the fairing support member 26 to the inner fairing member 24.

Figure 6:
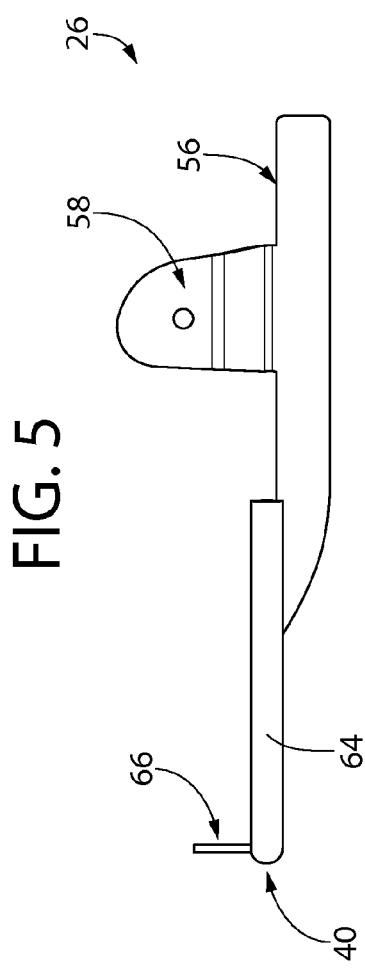
FIG. 6 is a side elevation view of a fairing support member in accordance with aspects of the present disclosure.
Figure 7:
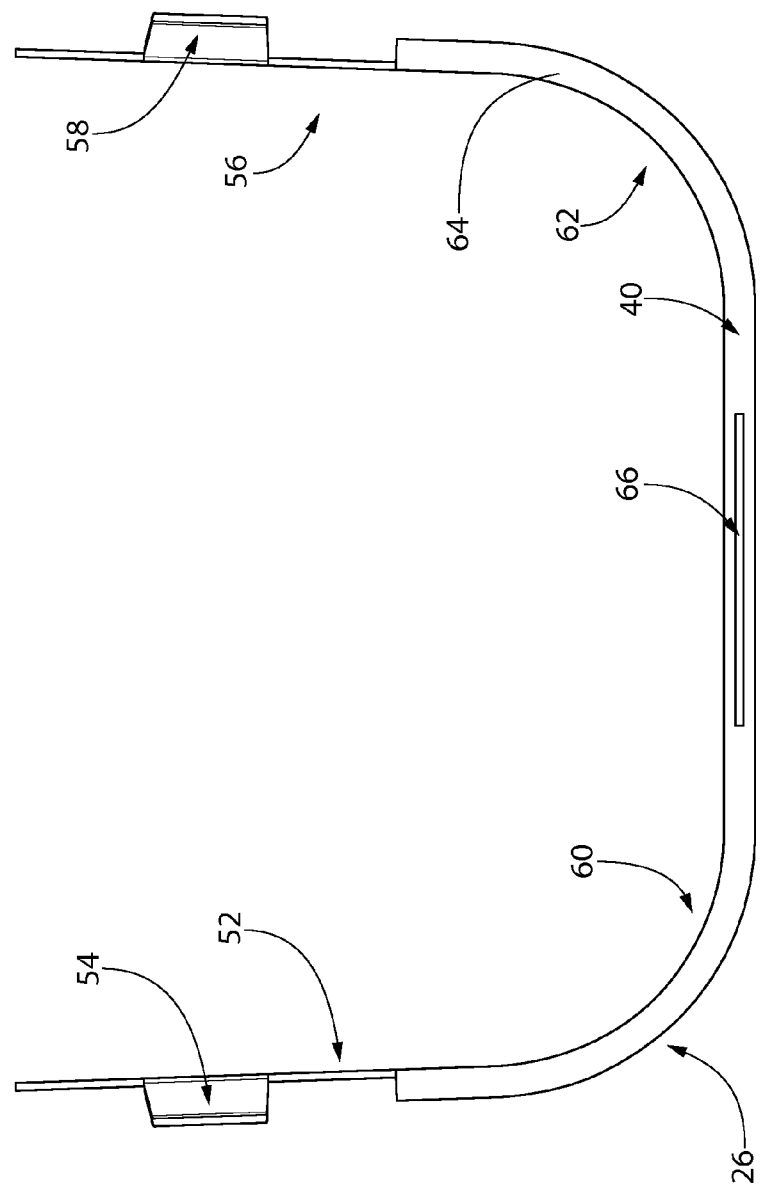
FIG. 7 is a top plan view of a fairing support member in accordance with aspects of the present disclosure.

Referring now to FIGS. 6 and 7 with continuing reference to FIGS. 1-3, the first support portion 52 is disposed at the first end 60 of the central portion 40 and extends longitudinally rearward to support the motorcycle fairing 22 via the lower portion 32 of the motorcycle fairing 22. The first support portion 52 includes the first coupling portion 54 in an embodiment to couple the motorcycle fairing support member 26 to the motorcycle fairing 22. The first coupling portion 54 is configured to couple the motorcycle fairing support member 26 to the inner fairing member 24 of the motorcycle fairing 22.

The second support portion 56 of an embodiment is disposed at the second end 62 of the central portion 40 and also extends longitudinally rearward to support the motorcycle fairing 22 via the lower portion 32 of the motorcycle fairing 22. The second support portion 56 of an embodiment includes the second coupling portion 58 to couple the motorcycle fairing support member 26 to the motorcycle fairing 22. The second coupling portion 56 is configured to couple the motorcycle fairing support member 26 to an inner fairing member 24 of the motorcycle fairing 22. The central portion 40, first support portion 52, and second support portion 56 are configured to be concealed by the motorcycle fairing 22 when the fairing support member 26 is mounted on the motorcycle 10.

Figure 8:
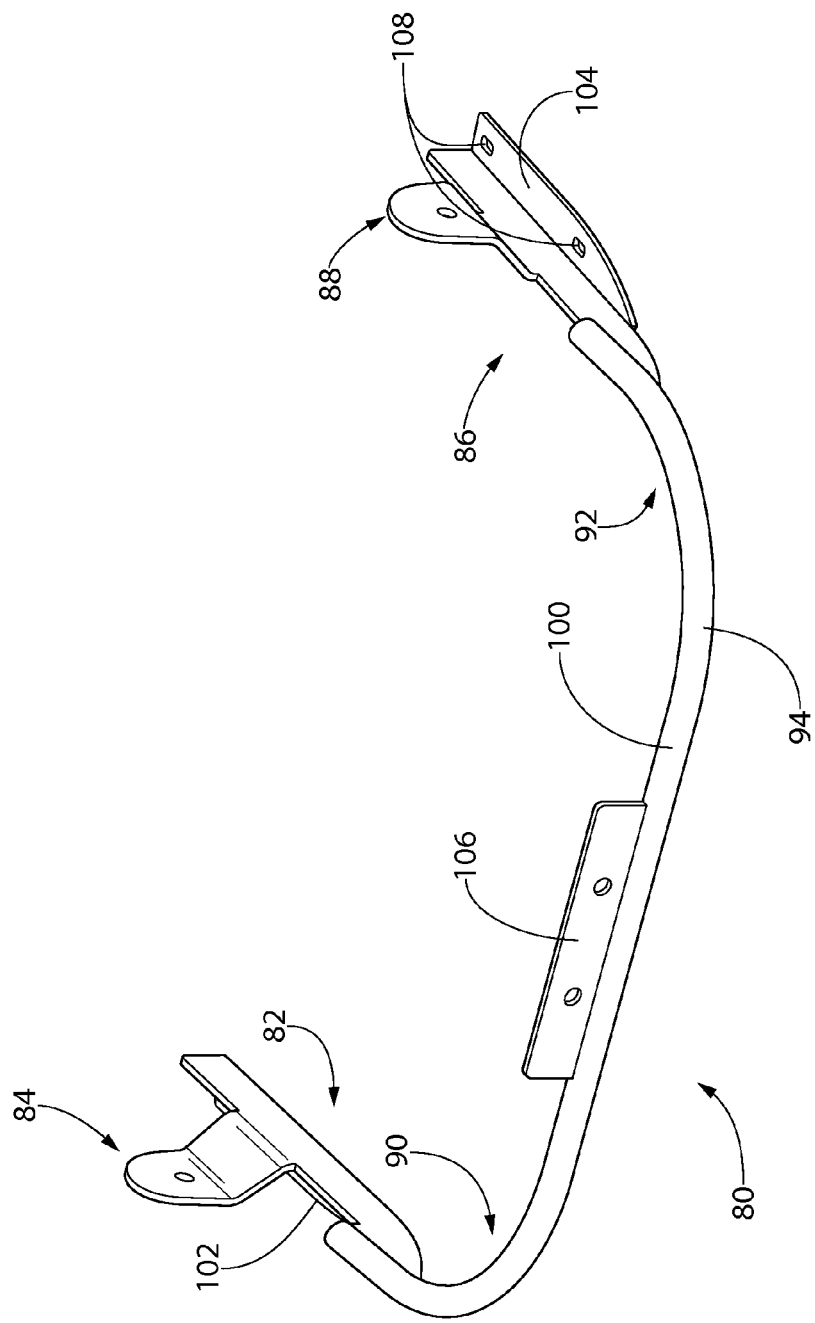
FIG. 8 is a perspective view of a fairing support member in accordance with aspects of the present disclosure.

Reference is now made to FIG. 8, which illustrates a fairing support member 80 in accordance with another embodiment of the present disclosure. One of ordinary skill in the art will appreciate that fairing support member 80 corresponds substantially with the structure, function, and form of fairing support member 26 except where the structure of fairing support member 80 dictate differently. The fairing support member 80 includes a first support portion 82 having a first coupling portion 84 coupling the fairing support member 80 to the inner fairing member 24 shown in FIGS. 1-3. The fairing support member 80 further includes a second support portion 86 having a second coupling portion 88 coupling the fairing support member 80 to the inner fairing member 24 shown in FIGS. 1-3. The fairing support member 80 of an embodiment includes the first support portion 82 at a first end 90 of a central portion 100, the second support portion 86 at a second end 92 of the central portion 100, and a bar 94 extending continuously from the first support portion 82 to the second support portion 86. In one embodiment, the bar 94 is a solid round bar. In other embodiments, the bar 94 is square or rectangular and/or solid or hollow. The fairing support member 80 further includes a first vertical support portion 102 extending substantially horizontally outward from the first support portion 82. The fairing support member 80 further includes a second vertical support portion 104 extending substantially horizontally outward from the second support portion 86. In an embodiment, the first vertical support portion 102 and the second vertical support portion 104 are positioned under a lower surface of the inner fairing member 24 and provide vertical support for the inner fairing member 24. In one or more embodiments, one or more fasteners (not shown) are positioned in, and extend through, one or more vertical support portion openings 108. In an embodiment, the one or more fasteners (not shown) further extend into or through the inner fairing member 24 to couple the fairing support member 80 to the inner fairing member 24. The central portion 100 of an embodiment has a central coupling portion 106 that is configured to couple the fairing support member 80 to the fairing bracket 28 of the motorcycle 10, as illustrated in FIGS. 1-3.

In accordance with additional aspects of the present disclosure, a method of supporting a motorcycle fairing 22 is disclosed. The method includes providing the fairing support member 26 having the central portion 40 with the central coupling portion 66 for coupling to the fairing bracket 28 of the motorcycle 10. The fairing support member 26 further includes the first support portion 52 for coupling to the lower portion 32 of the inner fairing member 24 and the second support portion 56 for coupling to the lower portion 32 of the inner fairing member 24. The method further includes coupling the fairing support member 26 to the fairing bracket 28 at the central coupling portion 66 and supporting the inner fairing member 24 at the lower portion 32 of the inner fairing member 24 with the first support portion 52 and the second support portion 56 of the fairing support member 26.

In an embodiment, the method further includes coupling the fairing support member 26 to the lower portion 32 of the inner fairing member 24 at the first support portion 52 and the second support portion 56. The method of another embodiment includes concealing the fairing support member 26 with the outer fairing member 48.

One of ordinary skill in the art will appreciate that the methods relating to fairing support member 26 disclosed herein include one or more embodiments relating to fairing support member 80. One or more embodiments of the methods of the present disclosure includes the fairing support member 80 replacing the fairing support member 26. An embodiment of the present disclosure further includes the step of coupling the fairing support member 80 to the lower portion 32 of the inner fairing member 24 at the first support portion 52 and the second support portion 56 at the first vertical support portion 102 and the second vertical support portion 104 to provide vertical support for the inner fairing member 24.

While particular embodiments of the present disclosure have been illustrated and described, it would be obvious to those skilled in the art that various other changes and modifications can be made without departing from the spirit and scope of the present disclosure. It is therefore intended to cover in the appended claims all such changes and modifications that are within the scope of this disclosure.

I claim:

1. A motorcycle fairing support assembly comprising:
    a fairing bracket extending longitudinally forward from a neck portion of a motorcycle frame;
    an inner fairing member coupled to the fairing bracket;
    a fairing support member adjacent to an inner fairing member outer surface and having a central portion coupled to the fairing bracket; and
    an outer fairing member coupled to the inner fairing member and concealing the fairing support member.

2. The assembly of claim 1, wherein the fairing support member includes a first support portion having a first coupling portion coupling the fairing support member to the inner fairing member.

3. The assembly of claim 2, further comprising a fairing adjustment member disposed between the inner fairing member and the fairing bracket to angle the inner fairing member relative to the fairing bracket.

4. The assembly of claim 1, wherein the fairing support member further includes a contour, wherein the contour substantially corresponds with an outer surface contour of the inner fairing member.

5. The assembly of claim 4, wherein the fairing support member includes a second support portion having a second coupling portion coupling the fairing support member to the inner fairing member.

6. The assembly of claim 5, further comprising a headlamp disposed at least partially at a higher location than the fairing support member when the motorcycle fairing support assembly is mounted on a motorcycle.

7. The assembly of claim 6, wherein the fairing support member further includes a first support portion at a first end of the central portion, a second support portion at a second end of the central portion, and a bar extending continuously from the first support portion to the second support portion.

8. The assembly of claim 7, wherein the bar is a round bar.

9. A motorcycle fairing support member comprising:
    a central portion extending laterally when mounted on a motorcycle and having a first end, a second end, and a central coupling portion configured to couple the fairing support member to a fairing bracket of the motorcycle;
    a first support portion disposed at the first end of the central portion and extending to support a motorcycle fairing; and
    a second support portion disposed at the second end of the central portion and extending to support the motorcycle fairing, wherein the central portion, first support portion, and second support portion are configured to be concealed by the motorcycle fairing when the motorcycle fairing support member is mounted on the motorcycle.

10. The fairing support member of claim 9, wherein the first support portion includes a first coupling portion to couple the motorcycle fairing support member to the motorcycle fairing.

11. The fairing support member of claim 10, wherein the first coupling portion is configured to couple the motorcycle fairing support member to an inner fairing member of the motorcycle fairing.

12. The fairing support member of claim 11, wherein the second support portion includes a second coupling portion to couple the motorcycle fairing support member to the motorcycle fairing.

13. The fairing support member of claim 12, further comprising a contour, wherein the contour substantially corresponds with an outer surface contour of the inner fairing member.

14. The fairing support member of claim 13, wherein the second coupling portion is configured to couple the motorcycle fairing support member to an inner fairing member of the motorcycle fairing.

15. The fairing support member of claim 14, further comprising a contour, wherein the contour substantially corresponds with an outer surface contour of the inner fairing member.

16. The fairing support member of claim 15, further comprising a bar extending continuously from the first support portion to the second support portion.

17. The fairing support member of claim 16, wherein the bar is a round bar.

18. The fairing support member of claim 17, further comprising a first vertical support portion disposed at the first support portion to vertically support the motorcycle fairing.

19. The fairing support member of claim 18, further comprising a second vertical support portion disposed at the second support portion to vertically support the motorcycle fairing.

20. A method of supporting a motorcycle fairing, comprising:
providing a fairing support member having a central portion with a central coupling portion for coupling to a fairing bracket of a motorcycle, a first support portion for coupling to a lower portion of an inner fairing member, and a second support portion for coupling to the lower portion of the inner fairing member;
coupling the fairing support member to the fairing bracket at the central coupling portion; and
supporting the inner fairing member at the lower portion of the inner fairing member with the first support portion and the second support portion of the fairing support member.

21. The method of claim 20, further comprising coupling the fairing support member to the lower portion of the inner fairing member at the first support portion and the second support portion.

22. The method of claim 21, further comprising vertically supporting the motorcycle fairing with a first vertical support portion disposed at the first support portion and a second vertical support portion disposed at the second support portion.

23. The method of claim 22, further comprising coupling the fairing support member to the lower portion of the inner fairing member at the first vertical support portion and the second vertical support portion.

24. The method of claim 23, wherein the fairing support member comprises a contour, wherein the contour substantially corresponds with an outer surface contour of the inner fairing member.

25. The method of claim 24, further comprising concealing the fairing support member with an outer fairing member.

* * * * *